Aug. 1, 1944.   W. C. PROTZ   2,354,702
COMPOSITE TAPE
Filed Feb. 26, 1943
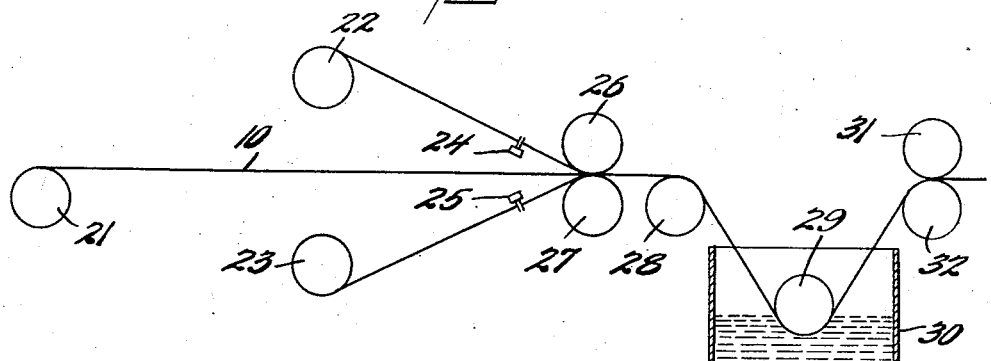
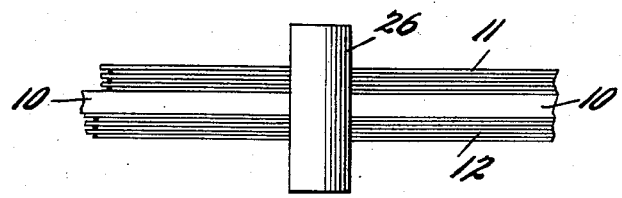
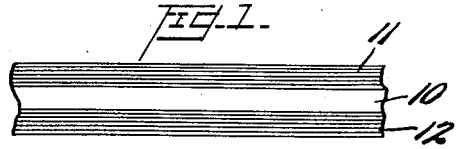
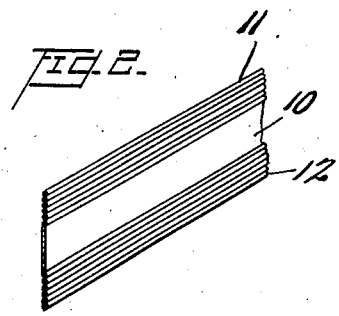
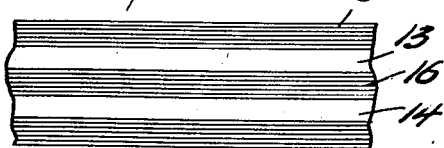
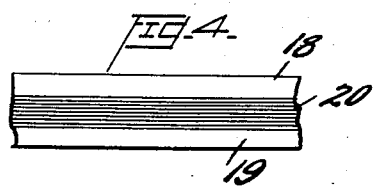
Inventor
William C. Protz,
By Strauch & Hoffman
Attorneys Patented Aug. 1, 1944

2,354,702

UNITED STATES PATENT OFFICE 2,354,702

COMPOSITE TAPE

William C. Protz, Manitowoc, Wis., assignor to National Tinsel Manufacturing Company, Manitowoc, Wis., a corporation of Wisconsin Application February 26, 1943, Serial No. 477,265

9 Claims. (Cl. 28—80)

This invention relates to weftless tape for fancy ties for gift or other packages, and more particularly to ornamental composite tape structures of said character and to methods of manufacturing them.

Composite weftless tying tapes now in use are made of various materials, such as cotton or like threads, paper, Cellophane, and fibre. Lahm is sometimes used to add ornamentation. In prior composite tapes of this type now in use the longitudinal tape elements are secured together by lapping certain of said elements one on top of the other, or by laminating the elements. Such tapes are relatively thick and inflexible, and embody considerable material.

I have discovered that it is practical to join tape elements, such as threads or strips of paper or the like, adhesively together in edge to edge contact with no lapping or lamination of material entering into the composite tape structure, and to thus produce a thin, single layer, and highly flexible tape from a minimum amount of material.

The major object of the present invention is to provide a novel composite flexible, single layer weftless tape having the component elements all arranged longitudinally and adherently secured together in side by side relation.

A further important object of the invention is to provide a novel method of forming a thin, composite tape by an edge to edge joining of a plurality of adhesive-saturated tape members of different materials.

A still further object of the invention is to provide a flexible, weftless tape structure composed of different materials, capable of withstanding considerable longitudinal stress, and all arranged between the surface planes of the materials of which the tape is made.

Yet another object of the invention is to provide a composite tape structure comprising a plurality of tape materials selected to give varied ornamental effects or designs without the addition of ornamenting materials to the tape surfaces that would increase the thickness and cost of production of the tape.

Still another object is to provide a novel binding tape constructed of cotton or like threads and a paper strip or strips, arranged and adhesively secured together in side by side relation.

Other objects of the invention will presently appear as the description proceeds in connection with the appended claims and the annexed drawing, in which:

Figure 1 is a top plan view of a piece of finished tape of preferred form;

Figure 2 is an end view on an enlarged scale of the finished tape more clearly illustrating the edge to edge adhesion between the side edges of the threads and paper strip constituting a tape made in accordance with this invention;

Figure 3 is a top plan view of a modified form of tape made in accordance with the present invention;

Figure 4 is a plan view of another modified form of tape made in accordance with the present invention;

Figure 5 is a diagrammatic side view illustrating an apparatus for producing tape in accordance with the method of the present invention;

Figure 6 is an enlarged exaggerated plan view illustrating the manner in which a paper strip and a multiplicity of threads are lined up for edge to edge adhesion in one composite flat layer.

The preferred form of composite weftless tape illustrated in Figures 1 and 2 of the drawing comprises a relatively narrow strip of paper or the like 10, and two groups 11 and 12 of threads disposed in parallelism to the strip and arranged at opposite sides thereof as illustrated in the drawing. These strips of paper and threads are disposed in co-planar relation as shown best in Figure 2. The strips and threads are secured together to form a unitary structure by impregnating or coating the elements of the tape with a suitable adhesive, said adhesive securing the strip and threads firmly together in edge to edge relation in the same plane. Any adhesive of the character commonly used in the production of weftless tapes may be employed.

In the drawing the width of the completed tape, as well as its thickness, is greatly exaggerated for purposes of clear illustration. This invention contemplates particularly the production of tapes of relatively narrow overall widths useful for the purpose of tying packages. Such tapes are customarily made of an overall width of from about one-eighth of an inch to three-quarters of an inch or more. The thickness of the tapes of the present invention is that of ordinary paper. Preferably, the strip of paper, in the form of invention shown in Figures 1 and 2, will have a width approximating one-third of the total width of the completed tape. Threads of appropriate numbers will be disposed at opposite sides of the strip to produce the tape of the width desired.

The threads of groups 11 and 12 are preferably cotton or rayon, though it will be understood that any threads heretofore used for the purpose of producing similar tapes may be employed. Paper is preferred as the material from which the strip 10 is made though it will be understood that the equivalent of paper may be used if desired.

Preferably, in order to provide an ornamental tape, paper is selected having a color that contrasts with the color of the threads that compose the groups 11 and 12, or, if desired, further ornamental effects can be produced by utilizing threads of one color in the group 11 and threads of another color in the group 12, or the threads of the same group may be vari-colored.

The appearance of the completed tape may further be varied as desired by selecting paper and threads of varying finish. Paper having a glossy finish, combined with threads of a different color and presenting a dull external appearance, constitute a preferred embodiment of the present invention. Various other combinations may be devised as will be readily apparent to those skilled in the art.

By arranging the paper strip 10 and the groups of threads 11 and 12 in co-planar relation it will be appreciated that many desirable ornamental effects can be produced without the application of any layers of further material applied to either side of the completed tape. Tapes used for the purposes of the tape of the present invention have heretofore been widely ornamented by the application of laminations, or part laminations, of contrasting materials applied to a base tape, such applications increasing the thickness and thus reducing the flexibility of the tying tape, as well as increasing the cost of production thereof. When paper, lahm or the like was heretofore used in the production of strips of tapes of the character here involved, it was applied as a lamination or part lamination of the tape. The present invention contemplates embodying the paper or the like in the plane of the threads of which the weftless tape is principally composed.

Figure 3 illustrates a modified form of the invention consisting of narrow paper or like strips 13 and 14 and three groups of threads 15, 16 and 17, all arranged in co-planar relation and in the manner particularly illustrated in this figure. This arrangement may be used in the production of the wider tapes. The susceptibility of the tape of this form of the invention to ornamentation by the selection of properly contrasting strips of paper or the like and threads will be obvious to those skilled in the art.

In the further modification of the present invention illustrated in Figure 4 the tape comprises narrow paper or like strips 18 and 19, and a group of threads 20 arranged between the strips 18 and 19 and the threads of the group 20 being all arranged in co-planar relation as in the form of the invention first described.

In the forms of the invention illustrated in Figures 3 and 4, the threads and strips are secured together in edge to edge relation by the adhesive which is applied in the production of the tape.

It has been found that tapes constructed of a strip or strips of paper and a multiplicity of threads all arranged in side by side or co-planar relation has a high degree of flexibility due to the unlaminated character of the structure, and that the tapes of the present invention are less costly to produce because a lesser amount of material is employed in their production. Yet the completed product has the relatively great tensile strength required of a tape intended essentially for the fancy tying of bundles or packages. It is found further that the tape of the present invention is less likely to split lengthwise than tapes heretofore made of laminated or part laminated structure of a weftless character.

If desired, the tapes of the present invention may be printed with advertising matter, if a tape commonly known as "advertising string" is desired. It will be understood that the tape may be printed after it has been completely made, or if preferred the paper strips embodied in the tape may be printed before it is combined with the threads.

A convenient way of producing tapes of the present invention is illustrated diagrammatically in Figures 5 and 6. The paper strip is drawn from a spool 21. One-half of the threads of groups 11 and 12 are drawn from a spool or spools 22 above strip 10, the other half of said threads being drawn from a spool or spools 23 preferably disposed below the strip 10. The threads drawn from the spool or spools 22 are slightly spaced by a comb 24, while the threads drawn from the spool or spools 23 are likewise spaced by a comb 25, the arrangement of the teeth of the combs being such that the threads when they enter the pass between the rolls 26 and 27 will lie in relatively close side by side intercalated relation. When the thread and the strips emerge from the pass between the rolls 26 and 27, it will be understood that the strip and threads will be arranged in co-planar relation, such arrangement constituting the essence of the method of production of tapes in accordance with the present invention.

After the strip and threads, arranged as just stated, leave the pass between the rolls 26 and 27, the tape passes over a guide roller 28 and under a guide roller 29 arranged in a receptacle 30 containing the adhesive solution or suspension utilized in uniting the strips and threads in edge to edge relation. The adhesive necessary to unite these strips and threads adheres to the elements of the tape which is drawn from the receptacle by rollers 31 and 32, which may be suitably driven. Excess adhesive is removed and the completed strip is dried in a manner well understood in the art.

If desired, other ways of combining the multiplicity of threads and the strip or strips may be employed, as will be apparent to those skilled in the art.

The present invention also contemplates composite tapes such as already described that embody weft threads applied as described in my copending application, Serial No. 355,683, filed September 6, 1940. Such threads may be added to the composite tape herein described particularly when the tape assumes unusual width.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A weftless composite tape, comprising a multiplicity of thread-like strands and a relatively narrow strip of paper, said strands and strip being adhesively secured together in edge to edge relation.

2. A weftless tape, comprising a multiplicity of thread-like strands and a strip of paper between groups of said strands, said strands and strip being adhesively secured together in edge to edge relation.

3. A weftless composite tape, comprising in combination a multiplicity of threads and a coextensive strip of paper adhesively secured together in edge to edge relation.

4. A weftless composite tape, comprising in combination a multiplicity of threads adhesively secured together and a paper strip between groups of said threads, the edges of said strip adhering in longitudinal edge to edge relation to certain of said threads.

5. A composite weftless tape, comprising a multiplicity of closely adjacent longitudinal threads adhesively secured together and combined with one or more strips of paper arranged between the surface planes of said adhesively united threads.

6. A composite weftless ribbon, comprising a paper strip or strips and a multiplicity of threads disposed in coplanar relation and adhesively secured together along their longitudinally abutting edges.

7. A weftless ribbon, comprising a plurality of warp threads and a strip of paper or the like adhesively secured together by longitudinal edge to edge adhesion, said threads and strip being varicolored to provide ornamentation of the ribbon.

8. A tear resistant ribbon including cross tear resisting threads arranged along the edges of a paper or like strip in co-planar relation to said strip, said threads and strip being adhesively secured together in edge to edge relation.

9. A weftless tape comprising a plurality of strips of paper and a multiplicity of threads all arranged in co-planar relation and secured together by an adhesive.

WILLIAM C. PROTZ.